United States Patent
Steiner et al.

(10) Patent No.: US 11,643,051 B2
(45) Date of Patent: May 9, 2023

(54) HEATED WIPER DEVICE FOR A VEHICLE, IN PARTICULAR A SNOWGROOMER, AND SNOWGROOMER COMPRISING SUCH A HEATED WIPER DEVICE

(71) Applicant: PRINOTH S.P.A., Vipiteno (IT)

(72) Inventors: Günther Steiner, Colle Isarco (IT); Jamie Simon Thom, Mieders (AT)

(73) Assignee: PRINOTH S.P.A., Vipiteno (IT)

( * ) Notice: Subject to any disclaimer, the term of this patent is extended or adjusted under 35 U.S.C. 154(b) by 0 days.

(21) Appl. No.: 17/262,085

(22) PCT Filed: Jul. 26, 2019

(86) PCT No.: PCT/IB2019/056408
§ 371 (c)(1),
(2) Date: Jan. 21, 2021

(87) PCT Pub. No.: WO2020/021510
PCT Pub. Date: Jan. 30, 2020

(65) Prior Publication Data
US 2021/0291792 A1 Sep. 23, 2021

(30) Foreign Application Priority Data

Jul. 27, 2018 (IT) .................. 102018000007583

(51) Int. Cl.
*B60S 1/38* (2006.01)
(52) U.S. Cl.
CPC ............ *B60S 1/3805* (2013.01); *B60S 1/38* (2013.01); *B60S 1/3801* (2013.01); *B60S 2001/3813* (2013.01)
(58) Field of Classification Search
CPC ........ B60S 1/38; B60S 1/3805; B60S 1/3803; B60S 1/3801; B60S 2001/3812; B60S 2001/3813; H05B 3/84; E01H 4/02
(Continued)

(56) References Cited

U.S. PATENT DOCUMENTS

| 3,249,959 A | 5/1966 | Theckston |
| 4,387,290 A * | 6/1983 | Yasuda ................. B60S 1/3805 15/250.07 |

(Continued)

FOREIGN PATENT DOCUMENTS

| DE | 2164932 | 7/1973 |
| EP | 1566317 | 8/2005 |

(Continued)

OTHER PUBLICATIONS

Notification Concerning Submission, Obtention or Transmittal of Priority Document for International Application No. PCT/IB2019/056408 dated Sep. 12, 2019.

(Continued)

*Primary Examiner* — Gary K. Graham
(74) *Attorney, Agent, or Firm* — Neal, Gerber & Eisenberg LLP

(57) ABSTRACT

Heated wiper device for a vehicle, in particular for a snowgroomer, the wiper device comprising: a wiper blade configured for being springily against the windscreen's outer surface of the vehicle; a wiper blade carrier; wherein the wiper blade carrier supports and at least partially houses the wiper blade; a box supporting and at least partially housing the wiper blade carrier; a wiper arm comprising a first end coupled to the box and a second end configured for being rotatably coupled to the vehicle to enable the wiper blade to move on the windscreen; and an electrical heating device coupled to the box in a position such that the electrical heating device is facing the wiper blade carrier.

10 Claims, 4 Drawing Sheets

(58) Field of Classification Search
USPC .......................................... 15/250.07–250.09
See application file for complete search history.

(56) References Cited

U.S. PATENT DOCUMENTS

| | | | | |
|---|---|---|---|---|
| 4,967,737 | A | * 11/1990 | Bassett | ................. A61H 1/006 |
| | | | | 482/146 |
| 5,412,177 | A | 5/1995 | Clark | |
| 5,676,868 | A | 10/1997 | Simmons | |
| 7,721,382 | B2 | * 5/2010 | Malone | ................ B60S 1/3856 |
| | | | | 15/250.07 |
| 2012/0005856 | A1 | 1/2012 | Jones | |
| 2013/0193129 | A1 | * 8/2013 | Jones | ..................... B60S 1/381 |
| | | | | 219/202 |
| 2016/0318423 | A1 | * 11/2016 | Thibault | ............ B62D 33/0617 |

FOREIGN PATENT DOCUMENTS

| | | |
|---|---|---|
| EP | 2778026 | 9/2014 |
| WO | WO8904781 | 6/1989 |
| WO | WO2017/008859 | 1/2017 |

OTHER PUBLICATIONS

International Search Report and Written Opinion for International Application No. PCT/IB2019/056408 dated Dec. 10, 2019.
PCT Demand for International Preliminary Examination and Reply to International Search Report and the associated Written Opinion for International Application No. PCT/IB2019/056408 dated May 26, 2020.
Notification of Receipt of Demand by Competent International Preliminary Examining Authority (Form PCT/IPEA/402) for International Application No. PCT/IB2019/056408 dated Jun. 3, 2020.
Second Written Opinion of the International Preliminary Examining Authority for International Application No. PCT/IB2019/056408 dated Jul. 6, 2020.
Reply to the Second Written Opinion of the International Searching Authority for International Application No. PCT/IB2019/056408 dated Sep. 4, 2020.
Notification of Transmittal of the International Preliminary Report on Patentability (Form PCT/IPEA/416) for International Application No. International Application No. PCT/IB2019/056408 dated Oct. 20, 2020.

* cited by examiner

HEATED WIPER DEVICE FOR A VEHICLE, IN PARTICULAR A SNOWGROOMER, AND SNOWGROOMER COMPRISING SUCH A HEATED WIPER DEVICE

PRIORITY CLAIM

This application is a national stage application of PCT/IB2019/056408, filed on Jul. 26, 2019, which claims the benefit of and priority to Italian Patent Application No. 102018000007583, filed on Jul. 27, 2018, the entire contents of which are each incorporated by reference herein.

TECHNICAL FIELD

The present disclosure refers to a wiper device for snowgroomers. Therefore, the main technical field of reference for the present disclosure is the technical field of snowgroomers (i.e., the technical field of vehicles mainly used for grooming ski slopes). That is, it is precisely in this technical field of snowgroomers that the present disclosure offers the greatest advantages. However, the technical field of the present disclosure can also be extended to the general technical scope of all those vehicles (not just snowgroomers) that operate in cold environments where there may be accumulations of snow and/or ice on the windscreen and inside the windscreen wiper. Disadvantageously, such accumulations of snow and/or ice on the windscreen and inside the windscreen wiper delay or make it impossible to use the vehicle concerned.

BACKGROUND

With reference to the technical field of snowgroomers just described, some solutions are known that aim to overcome the above-mentioned problem of the accumulation of snow and/or ice on the windscreen and inside the windscreen wiper.

In particular, European Patent No. EP1566317 refers to snowgroomers and describes a heated wiper device. The term heated means, in brief, that the wiper device incorporates special heating devices that, when activated, are able to raise the temperature of the wiper device to the point of preventing and/or melting any accumulations of snow and/or ice on the windscreen or inside the windscreen wiper itself.

The solution described in European Patent No. EP1566317 requires the use of a hydraulic heating circuit. In particular, according to European Patent No. EP1566317, the wiper device comprises a blade (as known, made of rubber or at least having the windscreen contact lip in rubber) which is supported and moved by a special arm in turn having an end coupled in a rotatable manner (in a known manner) to the windscreen or to the chassis of the vehicle. The coupling of the arm to the vehicle and how the blade is moved on the windscreen is known not only to the person skilled in the art but, in general, to anyone who has a road vehicle. A metal support (in the form of a drawer) is provided between the activation arm and the rubber blade to support the blade and give sufficient mechanical structure to the coupling with the arm. The solution described in European Patent No. EP1566317 requires that hydraulic pipes be integrated into the metal support and placed between the support and the rubber blade. These hydraulic pipes define a hydraulic heating circuit inside of which a heating fluid flows. To heat the heating fluid, European Patent No. EP1566317 suggests using the heat already present inside the snowgroomer. In particular, European Patent No. EP1566317 suggests connecting the above-mentioned hydraulic heating circuit to the hydraulic cooling circuit of the snowgroomer's engine. However, the solution of the technique just described and offered by European Patent No. EP1566317 has some drawbacks. Among these drawbacks, the mechanical complexity of the solution, which requires the use of pipes to be integrated into the windscreen wiper, could be mentioned. These pipes have, of course, their own weight in addition to the weight of the fluid contained in them, and this additional weight can compromise the proper use of the windscreen wiper. That is, the snowgroomer often operates on steep slopes and this greater weight in ascent can press the blade too hard against the windscreen. On the contrary, in descent, the weight can cause the blade not to come into contact, or not to adhere correctly, to the windscreen.

Other disadvantages related to the hydraulic solution described in European Patent No. EP1566317 are the possibility of fluid leakage from the heating circuit and that reaching the desired temperature requires a priori that the engine and the cooling circuit concerned are already at temperature. This aspect means that the hydraulic solution described in European Patent No. EP1566317 is not optimal when the snow groomer is first started up, for example in the morning after a night spent at low temperatures. The hydraulic solution described in European Patent No. EP1566317 does not offer special options for adjusting the required heating, which may vary as external conditions change. Finally, one aspect that should not be underestimated, in European Patent No. EP1566317 the heating pipes are in direct contact with the rubber of the blade and, by virtue of the properties of this flexible material, excessive heating can cause the rubber to warp or, in any case, not to operate optimally.

Broadening the discussion to include vehicles other than snowgroomers, the use of other forms of heating other than hydraulic heating is also known. For example, German Patent No. DE2164932 and U.S. Pat. No. 3,249,959 describe the use of electrical heating resistors in the form of wires that when powered by current produce heat to heat the wiper concerned. However, even with those solutions described in German Patent No. DE2164932 and U.S. Pat. No. 3,249,959 the heating devices are in contact with the rubber blade (they are even sunken in the blade itself) and therefore have the above-mentioned problem of the potential excessive heating of the rubber. Furthermore, the solutions described in German Patent No. DE2164932 and U.S. Pat. No. 3,249,959 cannot be transferred to the snowgroomer field because in snowgroomers the accumulation of snow and ice is not limited to the blade but extends to the entire windscreen wiper (i.e., to the spaces between the blade carrier and the activation arm as well).

SUMMARY

Starting from this prior art, the purpose of the present disclosure is to create a heated wiper device, in particular for snowgroomers, capable of overcoming certain of the drawbacks described in certain of the prior art.

In accordance with these purposes, the present disclosure concerns a heated wiper device for a vehicle, in particular for a snowgroomer, wherein the heated wiper device comprises a wiper blade, made of rubber or having at least one free rubber lip, configured to be pressed in a sprung manner against the outer surface of the vehicle's windscreen.

The heated wiper device also comprises a wiper blade carrier made of metal material, which structurally supports the blade. In certain embodiments, the carrier is shaped like a drawer and has a substantially C-shaped section with side walls partially containing the blade and a bottom receiving the base of the blade opposite the lip. The base of the blade may have arched portions to make the coupling between the blade and carrier flexible.

The heated wiper device additional comprises a box supporting and at least partially housing the wiper blade carrier wherein this box is also shaped with a C-section having side walls partially containing the blade carrier and a bottom receiving the bottom of the blade carrier. There is a space or cavity between the two bottoms at least along certain stretches of the extension of the windscreen wiper.

The heated wiper device further comprises a windscreen wiper arm comprising a first blade carrier end and a second end configured to be rotatably coupled to the vehicle to enable the wiper blade to move on the windscreen when required.

In this structure, according to the main aspect of the disclosure, the wiper device also comprises an electrical heating device coupled to the box in a position so that the device is facing the wiper blade carrier, or is coupled to the box in the cavity between the box and the blade carrier.

Advantageously, this solution solves certain of the problems of certain of the known art, in particular certain of the problems described earlier of the prior art of European Patent No. EP1566317 (which is connected precisely to the technical field of snowgroomers). That is, the present disclosure eliminates the problem of leaks because there is no hydraulic circuit but only an electrical circuit. The solution of the present disclosure also does not weigh down the windscreen wiper and therefore avoids crushing the wiper against the windscreen in ascent and any detachment of the wiper in descent. The solution of the present disclosure further offers the possibility of immediately heating the reactive mode of the windscreen wiper, even when the engine is cold, and of changing its heating. In addition, the present disclosure not only heats the blade but the whole structure, also preventing the accumulation of snow or ice at the activation arm.

In certain embodiments, the electrical heating device comprises electrical heating resistors, in particular electrical heating resistors made in the form of at least one heating resistor foil. This embodiment with electrical heating resistor foils offers certain advantages in terms of relatively very small dimensions and relative easy application, for example through the use of adhesives. These electrical heating resistor foils are, of course, connected via electrical cables to the snowgroomer's internal power supply.

It should be appreciated that other electrical heating devices, such as infrared devices, can be used as an alternative or in combination with the electrical heating resistor foils.

In certain embodiments, the box is made of a relatively lightweight material and has a relatively good heat distribution capacity. In particular, the box can be made of aluminum. However, other materials can also be used, such as carbon or glass fibre or rigid plastics.

In different embodiments, the box can be made from a single piece or from a plurality of pieces coupled together with a pin along the longitudinal extension of the windscreen wiper blade. This multiple piece solution, on the one hand, enables to optimally follow the curved profile of the large windscreens of snowgroomers and, on the other hand, enables to control the distance between the box and the blade carrier.

In certain embodiments, the wiper device also comprises at least one temperature sensor for monitoring the temperature of the wiper device and/or of the surrounding environment. Advantageously, this sensor enables the performance of an automatic activation logic of the electrical heating devices by a control unit configured to receive the temperature data of the sensors, process this data and control the activation of the electrical heating devices. Once a pre-set temperature has been reached, the control unit can block the power supply and thus avoid damage due to overheating the blade.

The present disclosure also extends to the snowgroomer that comprises at least one embodiment of the electrically heated wiper device. In this case, the power supply control unit for the electrical heating devices is the same as the control unit for other snowgroomer functions. In other embodiments, the snowgroomer can also comprise a manual activation switch for the supply of the wiper device's electrical heating devices.

BRIEF DESCRIPTION OF THE DRAWINGS

Further characteristics and advantages of the present disclosure will become clear from the following description of a non-limiting embodiment thereof, with reference to the figures in the accompanying drawings, wherein.

DETAILED DESCRIPTION

Figure 1:
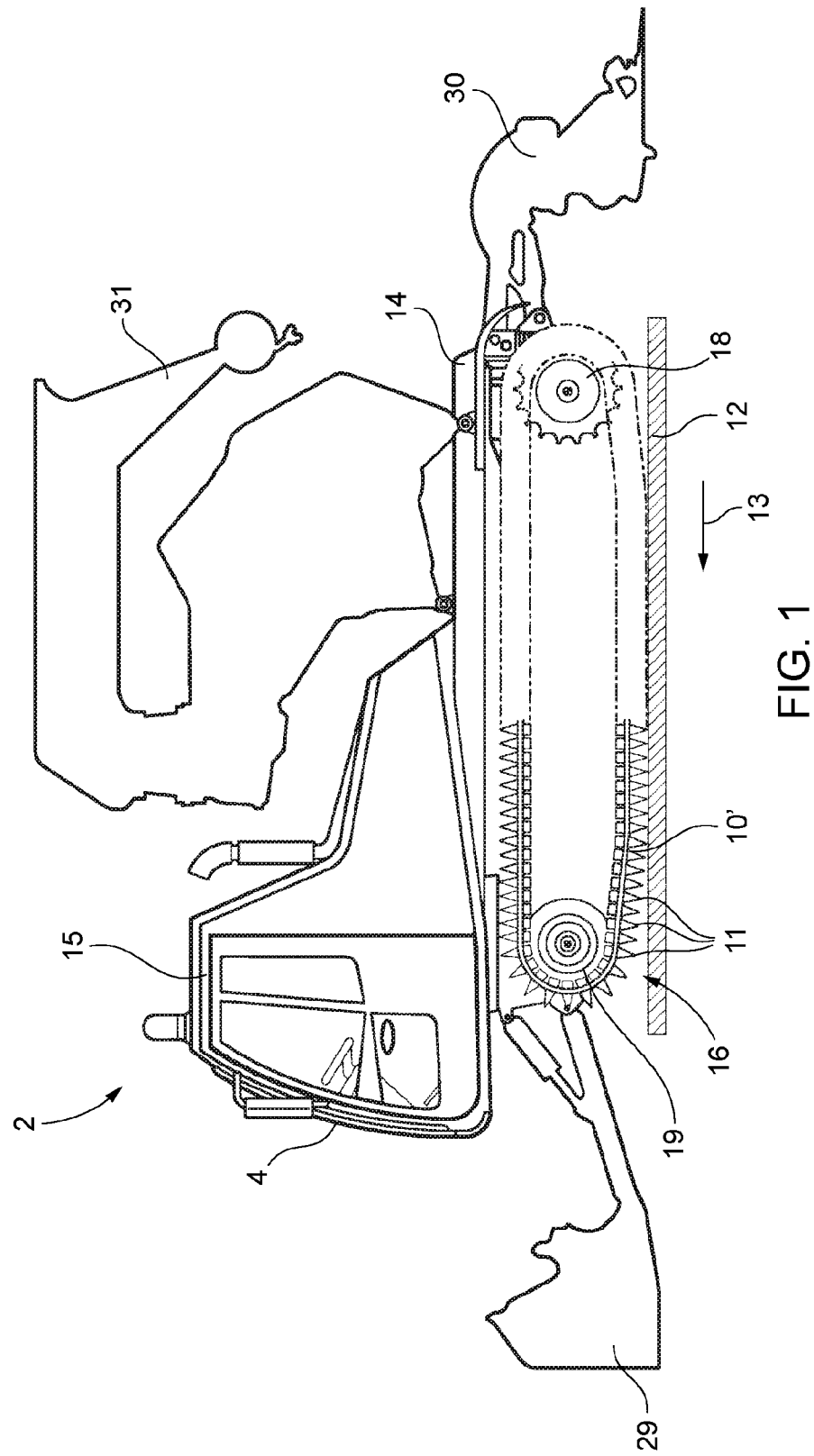
FIG. 1 shows a schematic view of a snowgroomer.

Referring now to the example embodiments of the present disclosure illustrated in FIGS. 1 to 6, a schematic view of a snowgroomer is shown with reference to FIG. 1. In certain embodiments, snowgroomers are the vehicles in which to install the present disclosure's windscreen device.

Figure 3:
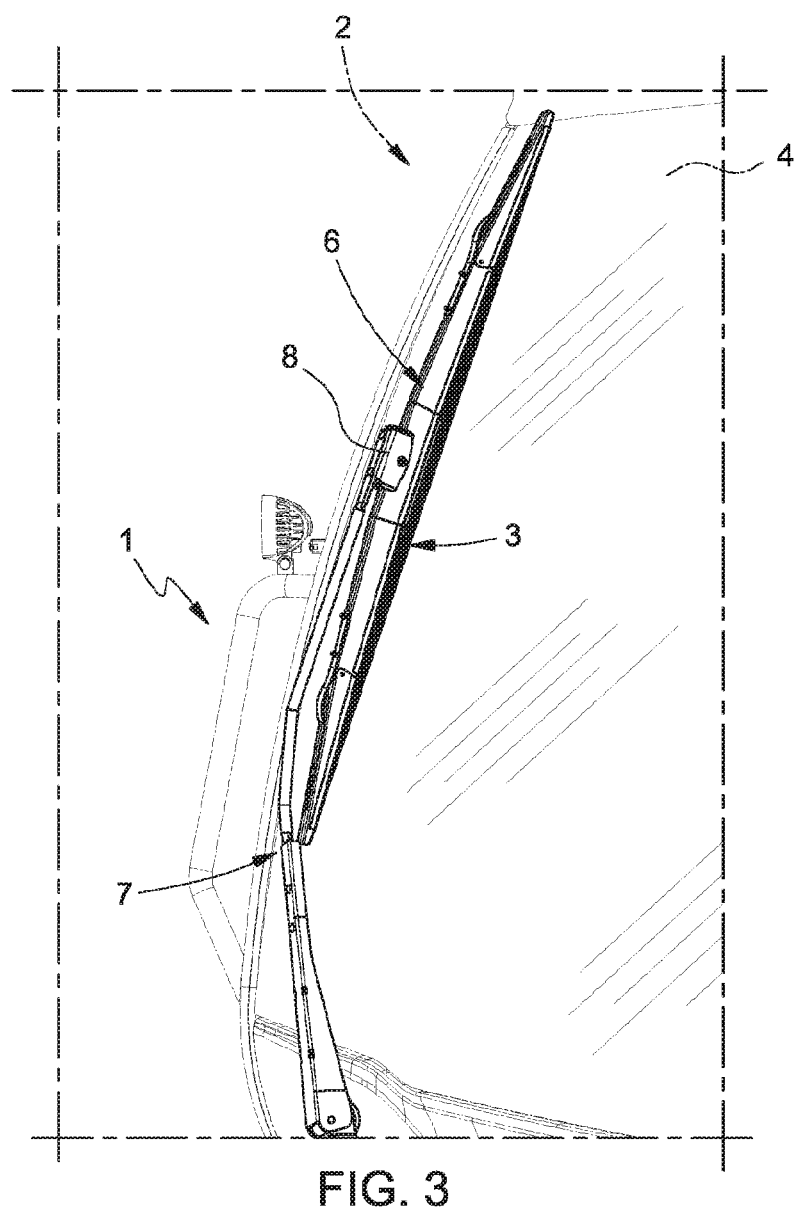
FIG. 3 shows the wiper device of FIG. 2 applied to the windscreen of a snowgroomer.

This snowgroomer 2 is a tracked vehicle and is motorized to advance along a slope 12 in a forward direction 13. The snowgroomer 2 is also equipped with a plurality of operating units such as, for example, a cutter 30 configured to groom the snow on ski slopes, a shovel 29 configured to move masses of snow along the ski slopes, and/or a winch group 31. The snowgroomer 2 comprises a support frame 14, a driver's cabin 15 mounted on the support frame 14 and two tracks 16 mounted on opposite sides of the support frame 14. Each track 16 comprises a plurality of belts 10' between a front wheel 19 and a rear wheel 18 and a plurality of cross bars 11 fixed to the belts 10'. The snowgroomer 2 comprises a windscreen 4 that can have a curved profile and large dimensions. FIG. 3 shows a portion of the windscreen 4 of a snowgroomer on which a special wiper device 1 operates when required.

Figure 2:
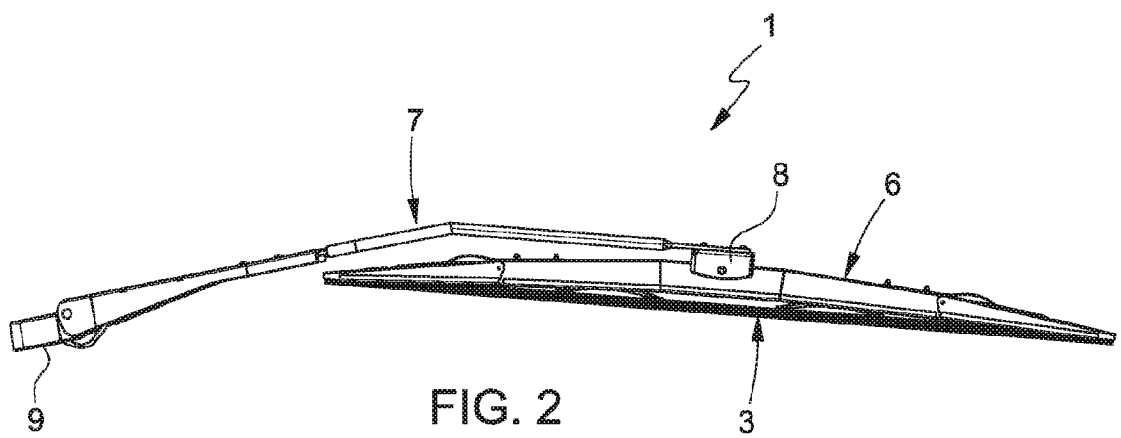
FIG. 2 shows a schematic view of a wiper device according to the present disclosure.
Figure 4:
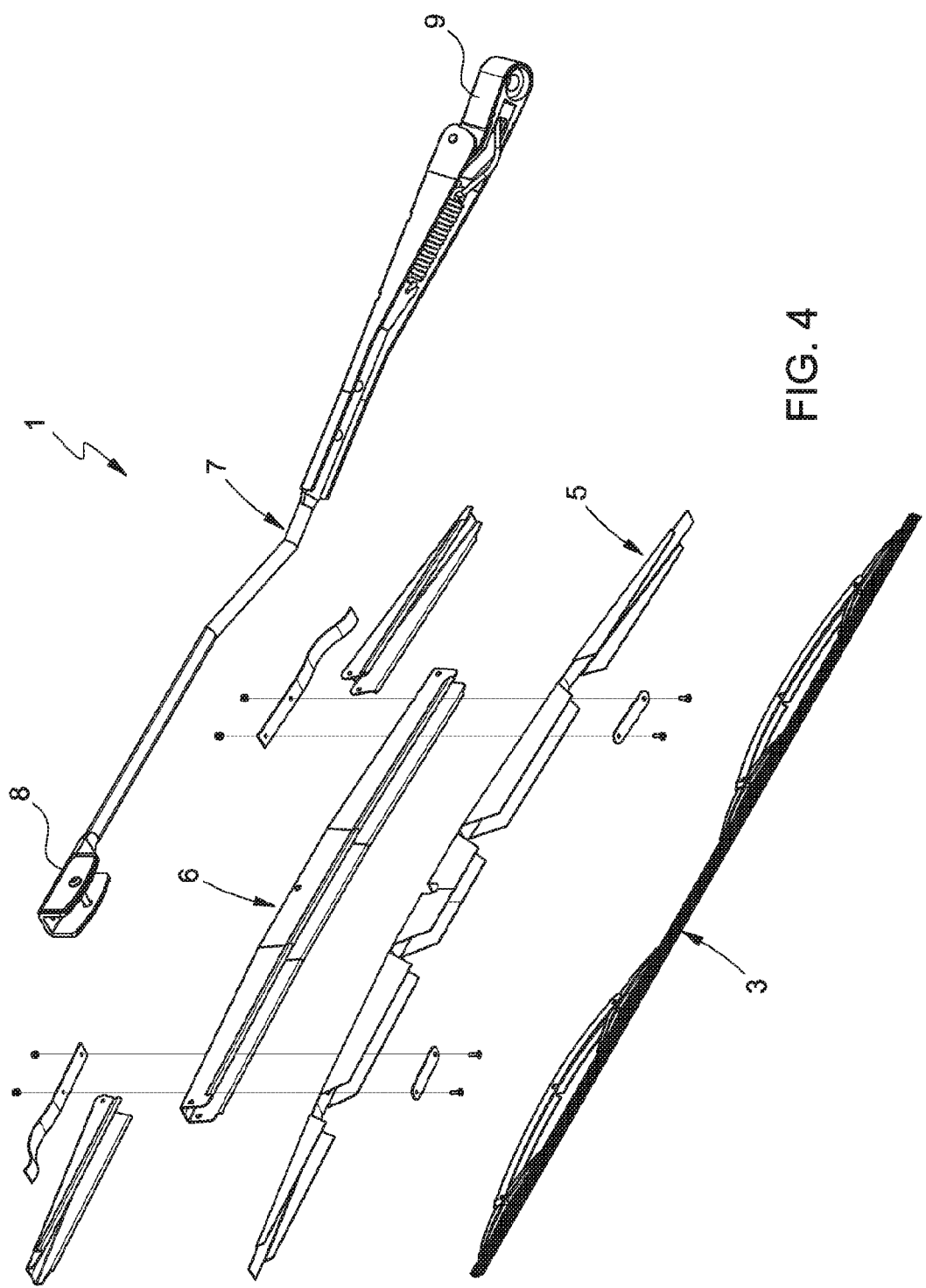
FIG. 4 shows an exploded schematic view of the wiper device of FIG. 2.

With reference to FIGS. 2 and 4, the wiper device 1 comprises;
- a windscreen wiper blade 3 configured for being pressed in a sprung manner against the outer surface of the windscreen 4;
- a wiper blade carrier 5; wherein the wiper blade carrier 5 supports and at least partially houses the wiper blade 3;
- a box 6 supporting and at least partially housing the wiper blade carrier 5;

a wiper arm 7 comprising a first end 8 coupled to the box and a second end 9 configured for being rotatably coupled to the vehicle to enable the wiper blade 3 to move on the windscreen 4.

According to the embodiment shown, both the carrier 5 and the box 6 are drawer-shaped (i.e., they have a substantially C-shaped section) wherein the carrier 5 houses the blade 3 and the box 6 houses the carrier 5. In FIG. 4 we can also see how the box 6 is made of a central piece and two opposite side pieces coupled with a pin to the central part. A fastener passes through a bottom wall of both the wiper blade carrier and the box as shown in FIG. 4.

Figure 5:
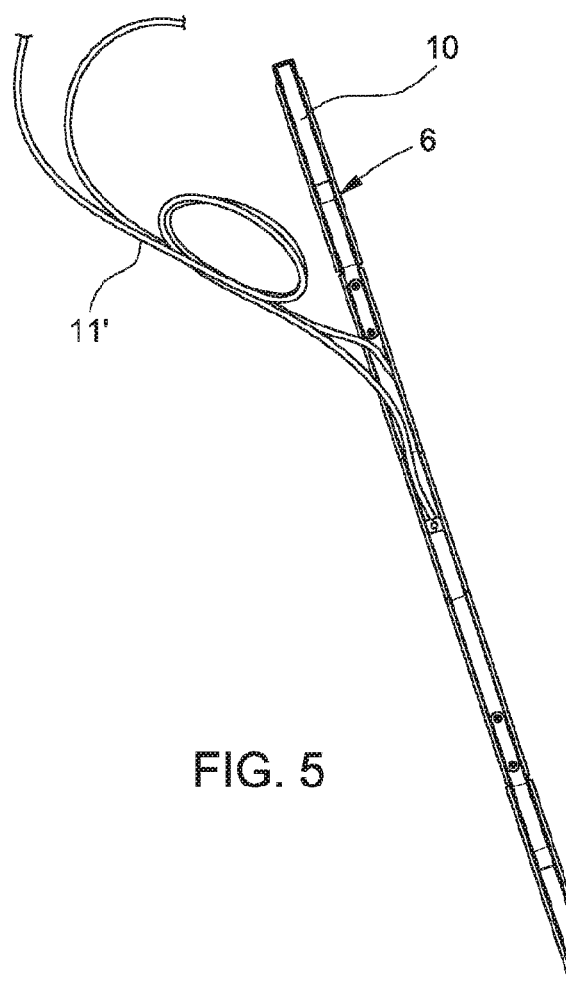
FIGS. 5 and 6 show details of the wiper device of FIG. 2.
Figure 6:
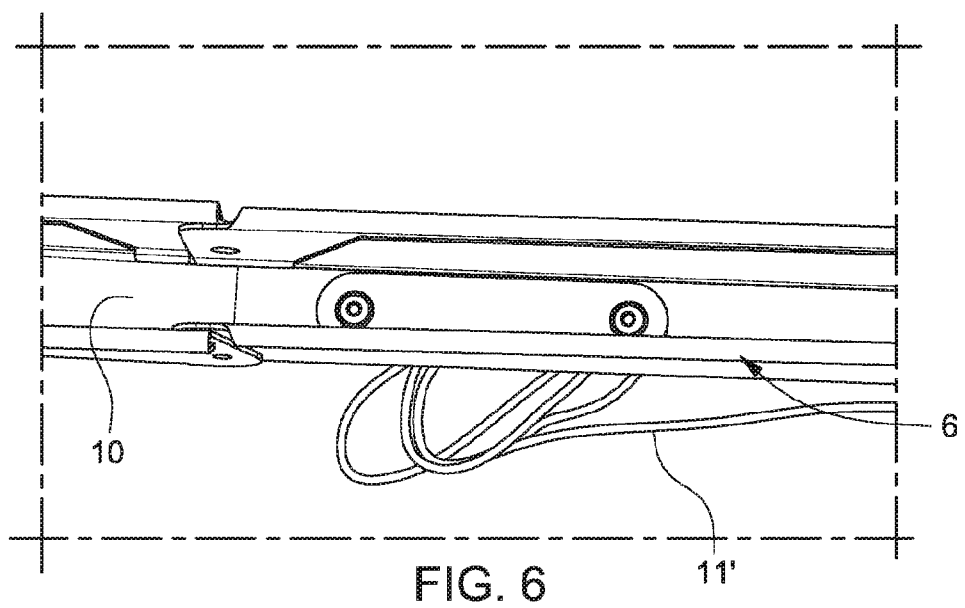

FIGS. 5 and 6 show the bottom of the box 6 (i.e., the receiving seat of the carrier 5). These figures show that there are electrical heating resistors 10 on the bottom of the box 6 that are made in the form of electrical heating resistor foils glued right on the bottom of the box 6 and powered by special electric cables 11'.

As described earlier, this particular solution, as well as the general concept of the present disclosure from which it derives, makes it possible to overcome certain of the problems of certain of the prior art that have been described and that concern the possible formation of ice and snow.

Lastly, it is clear that modifications and variations can be made to the disclosure described herein without departing from the scope of the appended claims. Accordingly, various changes and modifications to the presently disclosed embodiments will be apparent to those skilled in the art.

The invention claimed is:

1. A heated wiper device comprising:
a wiper blade springily pressable against a windscreen outer surface of a vehicle;
a wiper blade carrier supporting and at least partially housing the wiper blade, the wiper blade carrier comprising a C-shaped section having side walls and a bottom wall;
a box supporting and at least partially housing the wiper blade carrier via a fastener through the bottom wall of the C-shaped section of the wipe blade carrier and a bottom wall of the box, wherein the box comprises a C-shaped section comprising a plurality of C-shaped pieces coupled together with a pin along a longitudinal extension of the wiper blade, the C-shaped section having side walls engaging the side walls of the C-shaped section of the wiper blade carrier and a bottom portion configured to receive the wiper blade carrier;
an electrical heating device coupled to the box and positioned such that the electrical heating device is facing the wiper blade carrier, wherein the electrical heating device comprises an electrical heating resistor in the form of a heating resistor foil affixed to the bottom wall of the box; and
a wiper arm comprising a first end coupled to the box and a second end rotatably coupleable to the vehicle to enable the wiper blade to move on the windscreen outer surface of the vehicle.

2. The heated wiper device of claim 1, wherein the box is made of a material with a designated heat distribution capacity.

3. The heated wiper device of claim 2, wherein the box is made of aluminum.

4. The heated wiper device of claim 1, further comprising a temperature sensor configured to monitor at least one of a wiper device temperature and a surrounding environment temperature.

5. The heated wiper device of claim 1, wherein the vehicle comprises a snowgroomer.

6. The heated wiper device of claim 1, wherein the heating resistor foil is glued on the bottom wall of the box.

7. A snowgroomer comprising:
a windscreen outer surface; and
a heated wiper device comprising:
a wiper blade springily pressed against the windscreen outer surface;
a wiper blade carrier supporting and at least partially housing the wiper blade, the wiper blade carrier comprising a C-shaped section having side walls and a bottom wall;
a box supporting and at least partially housing the wiper blade carrier via a fastener through the bottom wall of the C-shaped section of the wipe blade carrier and a bottom wall of the box, wherein the box comprises a C-shaped section comprising a plurality of C-shaped pieces coupled together with a pin along a longitudinal extension of the wiper blade, the C-shaped section having side walls engaging the side walls of the C-shaped section of the wiper blade carrier and a bottom portion that receives the wiper blade carrier;
an electrical heating device coupled to the box and positioned such that the electrical heating device is facing the wiper blade carrier, wherein the electrical heating device comprises an electrical heating resistor in the form of a heating resistor foil affixed to the bottom wall of the box; and
a wiper arm comprising a first end coupled to the box and a second end rotatably coupled to the snowgroomer to enable the wiper blade to move on the windscreen outer surface.

8. The snowgroomer of claim 7, further comprising a switch for a manual activation of the electrical heating device of the heated wiper device.

9. The snowgroomer of claim 7, further comprising a control unit configured to automatically activate the electrical heating device of the heated wiper device.

10. The snowgroomer of claim 7, wherein the heating resistor foil of the electrical heating device of the heated wiper device is glued on the bottom wall of the box of the heated wiper device.

* * * * *